April 12, 1955
D. RAGLAND
2,706,027
AIR CONTROL SYSTEM, INCLUDING AIR
OPERATED CLUTCH WITH TIMER
Filed June 11, 1951
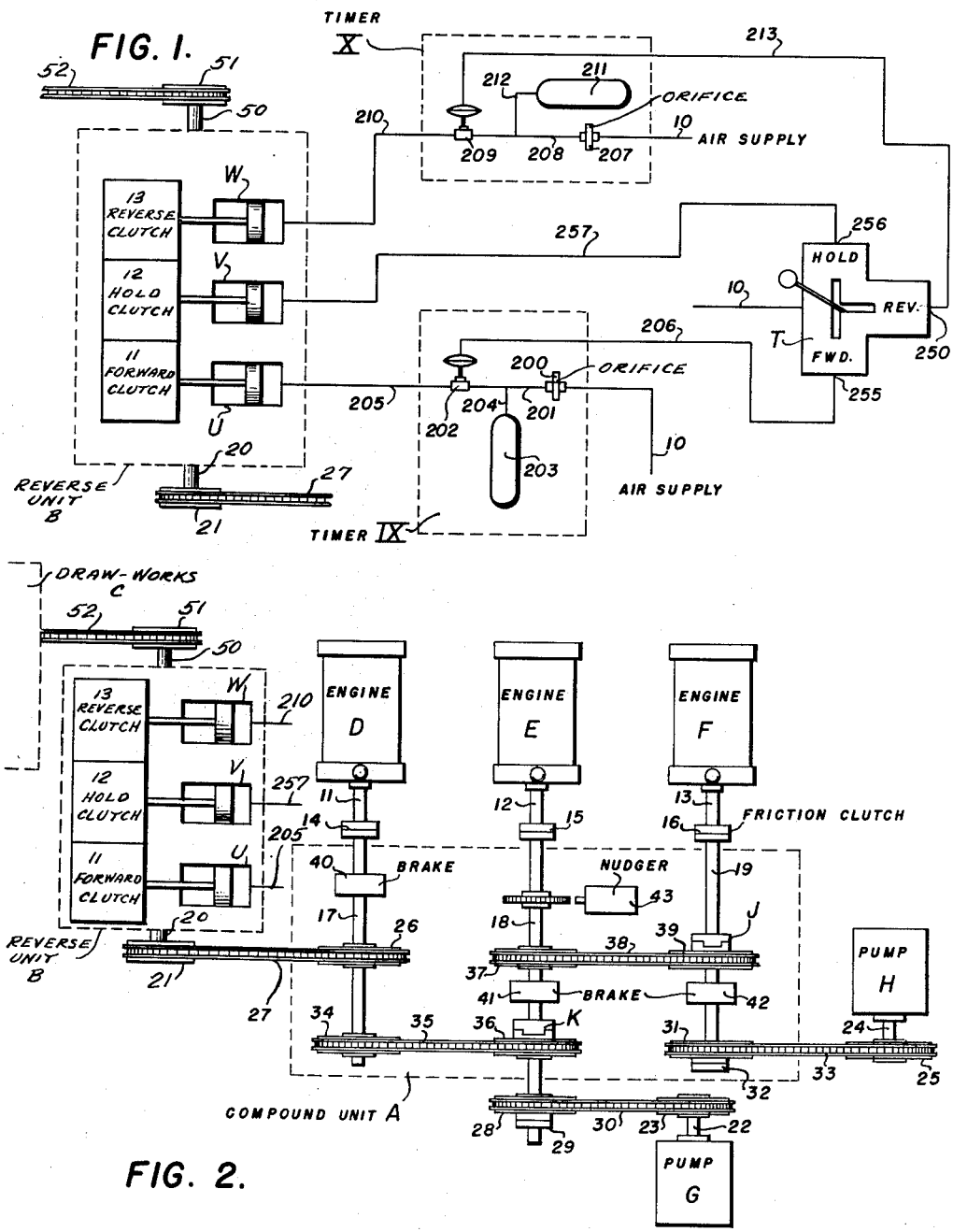
FIG. 1.
FIG. 2.
INVENTOR.
Douglas Ragland,
BY
ATTORNEY

United States Patent Office 2,706,027
Patented Apr. 12, 1955

2,706,027

AIR CONTROL SYSTEM, INCLUDING AIR OPERATED CLUTCH WITH TIMER

Douglas Ragland, Houston, Tex., assignor, by mesne assignments, to Esso Research and Engineering Company, a corporation of Delaware Application June 11, 1951, Serial No. 230,898

1 Claim. (Cl. 192—85)

This case is a continuation-in-part of my copending application Serial No. 153,425, filed April 1, 1950.

This application is directed to a compressed air control system for a power transmission unit.

The invention is more particularly directed to an air control system which includes one or more air actuated clutches and in which the system is arranged to produce smooth operation of the clutches.

Other advantages of the invention will be more fully understood from a reading of the following description taken with the drawings in which Fig. 1 is in the form of a diagrammatic flow sheet showing an application of the system; and, Fig. 2 is in the form of a top schematic view illustrating the mechanical equipment to which the control system of the preceding figure may be applied.

In the description of the drawing Roman numerals are employed to designate timing devices in the compressed air control system. Capital letters are used to designate parts of the mechanical system and important parts of the compressed air system. Arabic numerals are used to designate other parts of the system.

Turning now specifically to the drawing and first to Fig. 1, the system shown may be described generally as a compressed air control system; that is to say, signals are transmitted by changes in the pressure of air transmitted through pilot lines. In order to simplify the drawing a means for providing the compressed air is not shown, the compressed air being introduced into the system through a number of air inlet lines; since these air inlet lines all represent a means for supplying compressed air, they are all designated by the number 10. Timers IX and X are used to insure the smooth operation of the clutches of reverse unit B.

The mechanical unit shown in Fig. 2 will now be described:

Power from engines D, E, and F is applied through compound unit A to pumps G and H and to reverse unit B. Reverse unit B in turn transmits power to draw works C. Engines D, E, and F are connected to compound unit A by shafts 11, 12, and 13, respectively. These shafts in turn are provided with friction clutches 14, 15, and 16.

Within the compound unit are the three parallel shafts 17, 18, and 19. Shaft 17 is coaxial with engine shaft 11, shaft 18 is coaxial with engine shaft 12, and shaft 19 is coaxial with engine shaft 13.

Reverse unit B is driven through shaft 20 provided with sprocket 21 and in turn drives draw works C by means of shaft 50, sprocket 51 and chain 52. Pump G is driven through shaft 22 provided with sprocket 23, and pump H is driven through shaft 24 provided with sprocket 25. A sprocket 26 is mounted on shaft 17 in compound A and arranged to drive sprocket 21 of the reverse unit B through chain 27. A sprocket 28 is mounted on shaft 18 in compound A and is connected to this shaft through friction clutch 29 and is arranged to drive sprocket 23 of pump G through chain 30. A sprocket 31 is mounted on shaft 19 of compound A and is connected to this shaft through friction clutch 32 and is arranged to drive sprocket 25 of pump H through chain 33.

Within compound unit A, a sprocket 34 is mounted on shaft 17 and by chain 35 drives sprocket 36 which is mounted on shaft 18 and is releasably engaged thereto through jaw clutch K. A sprocket 37 is secured to shaft 18 and by chain 38 transmits power to sprocket 39 which is mounted on shaft 19 and may be engaged therewith through jaw clutch J.

Within compound unit A an inertia brake 40 is mounted on shaft 17, an inertia brake 41 is mounted on shaft 18, and inertia brake 42 is mounted on shaft 19. A device conveniently referred to as nudger or kicker, such as described and claimed in detail in the copending application entitled "Device for Giving Shaft Angular Movement," Serial No. 175,360, filed in the name of Robert R. Crookston on July 22, 1950, now United States Patent No. 2,563,584, issued August 7, 1951, is mounted on shaft 18 and designated as 43.

Timers IX and X are arranged to control the admission of compressed air to reciprocating compressed air operated motors U and W, respectively, of reverse unit B. Reciprocating compressed air operated motors U and W operate respectively forward clutch 11 and reverse clutch 13 of unit B. These clutches are shown schematically in the drawing as rectangles. Clutch 11 is engaged when the unit operates in the forward direction while clutch 13 is engaged when the unit operates in the reverse direction. Timers X and XI in conjunction with the reciprocating air operated motors U and W insure the smooth operation of these clutches.

In addition to forward clutch 11 and reverse clutch 13, the reverse unit B is provided with hold clutch 12, this clutch being operated by reciprocating compressed air operated motor V.

Timer IX consists of an orifice member 200 having its inlet connected to an air supply manifold 10. Orifice member 200 has an orifice of restricted size in comparison with the flow area of connecting lines 10 and 201 to limit the quantity of fluid flowing through it in a given time. Its outlet is connected through line 201 to the inlet of normally closed diaphragm valve 202. A chamber 203 is connected to line 201 by line 204. The outlet of diaphragm valve 202 is the outlet of the timing unit and is connected through line 205 to clutch U. The operation of the timer unit IX is controlled by air pressure imposed through pilot line 206 on the diaphragm of diaphragm valve 202.

Timer X consists of an orifice member 207 having its inlet connected to air supply manifold 10 and its outlet connected by line 208 to the inlet of diaphragm valve 209. Orifice member 207 has an orifice of restricted size in comparison with the flow area of connecting lines 10 and 208 to limit the quantity of fluid flowing through it in a given time. The outlet of diaphragm valve 209 is the outlet of the timer and is connected through line 210 to clutch W of the reverse unit. Chamber 211 is connected to line 208 by line 212. The operation of timer X is controlled by air pressure imposed through pilot line 213 on the diaphragm of diaphragm valve 209.

Timer IX has chamber 203 in communication with air supply manifold 10 through the orifice member 200. With valve 202 closed, the air through manifold 10 first fills tank 203 until the pressure in chamber 203 comes into equilibrium with the pressure in the air supply manifold 10. The volume of chamber 203 is slightly less than the volume of the motor U. Upon the opening of valve 202 the volume of air contained in chamber 203 rushes against the piston in motor U, thereby bringing the engaging portions of the clutch into close proximity or into light engagement so that there is substantial slippage. The final engagement of these members is accomplished by the high pressure air which must pass from manifold 10 to orifice 200 and open valve 202 into reciprocating compressed air operated motor U. This arrangement insures the smooth operation of clutch 10 since the initial and relatively rapid movement of the clutches brings the clutch elements only into light engagement while the final engagement of the clutches is relatively slow. It has been found necessary, for efficient operation, for the volume of the chamber 203 to be slightly less than the volume of the piston cylinder. Both pressure and volume are governing factors, however. If the chamber 203 is not changed in volume and the cylinder U is increased in volume, pressure against the piston in cylinder U decreases but the system does not operate efficiently. On the other hand, if the chamber 203 is made larger, the air supply pressure would have to be increased proportionately.

Timer X and reciprocating compressed air operated motor W are proportioned in exactly the same way as timer IX and reciprocating compressed air operated motor U. Here again the arrangement of chamber 211 which supplies most of the air required to actuate reciprocating compressed air actuated motor W so as to bring the clutch elements of clutch 13 into engagement with additional air leaking through orifice member 207 and passing through open valve 209 to bring the engaging portions of members 13 into contact for completing the engagement of clutch 13 insures the smooth actuation of this clutch.

Valve T is a three-way manually operated valve allowing air from air supply line 10 to be applied, at the option of the operator to either of reversible compressed air operated motors U, V, or W of reverse unit B. Valve T is supplied with air through air supply line 10. In the drawing outlet 255 has legend FWD applied thereto, outlet 250 has the legend REV and outlet 256 the legend HOLD.

In valve T the outlet 255 (FWD) is connected through pilot line 206 to the diaphragm of valve 202 of timer IX. Outlet 250 (REV) is connected through pilot line 213 to the diaphragm of valve 209 of timer X. Outlet 256 (HOLD) of valve T is connected through pilot line 257 of reciprocating compressed air operated motor V of reverse unit B.

If the valve T is adjusted to connect air supply line 10 to outlet 255 (FWD) of this valve, the air passes through pilot line 206 to the diaphragm of diaphragm valve 202 of timer IX. This causes valve 202 to open and allows air to pass from timer IX to reciprocating compressed air operated motor U of reverse unit B so that the reverse unit is shifted to its forward position by this adjustment of valve T.

If valve T is adjusted to connect air from air inlet 10 through air outlet 250 (REV) air passes through pilot line 213 to the diaphragm of diaphragm valve 209 of timer X. This causes valve 209 to open and allows air to pass from timer X to reciprocating compressed air operated motor W of reverse unit B so that the reverse unit is shifted to its reverse position by this adjustment of valve T.

If valve T is adjusted to connect air from air inlet 10 to outlet 256 (HOLD) air passes through pilot line 257 to reciprocating compressed air operated motor V of the reverse unit B and shifts the reverse unit to the hold position.

When valve 202 of timer IX is opened to allow air to fill reciprocating compressed air operated motor U, smooth operation of the clutch 11 is obtained because chamber 203 holds almost, but not quite enough air to cause reciprocating air operated motor U to actuate clutch 11 and the remainder is supplied by air passing from air supply line 10 through orifice 200 as has previously been explained. Similarly, when valve 209 of timer X is closed smooth operation of clutch 13 is obtained by like proportioning of the volume of chamber 211 and reciprocating compressed air operated motor W as heretofore explained.

Having fully described and illustrated my invention, what I wish to claim is:

A power transmitting assembly comprising in combination, a prime mover, an input shaft, a friction clutch provided with a reciprocating compressed air motor for operating said clutch, said clutch being mounted on said input shaft for connecting said shaft with said prime mover, a compressed air system for filling the reciprocating compressed air operated motor, said system comprising an orifice member having an orifice of restricted size and having its inlet connected to a source of compressed air capable of supplying air at approximately the operating pressure of said air-operated motor, a chamber of fixed volume, said volume being almost the same as but slightly less than the volume of said reciprocating compressed air operated motor, a valve, a manifold connecting said chamber and the outlet of said orifice member with the inlet of said valve and a conduit connecting the outlet of said valve with said reciprocating compressed air operated motor.

References Cited in the file of this patent

UNITED STATES PATENTS

| | | |
|---|---|---|
| 1,118,994 | Woolley | Dec. 1, 1914 |
| 2,105,625 | Wichtendahl | Jan. 18, 1938 |
| 2,159,170 | Maybach | May 23, 1939 |
| 2,170,538 | Sarver | Aug. 22, 1939 |
| 2,191,669 | Kress | Feb. 27, 1940 |
| 2,376,545 | Livermore | May 22, 1945 |
| 2,461,218 | Lapsley | Feb. 8, 1949 |
| 2,642,972 | Brooks | June 23, 1953 |